United States Patent
Ishii et al.

(10) Patent No.: US 11,852,565 B2
(45) Date of Patent: Dec. 26, 2023

(54) FRACTURE TIME ESTIMATION DEVICE FOR INTERNAL STEEL AND METHOD

(71) Applicant: Nippon Telegraph and Telephone Corporation, Tokyo (JP)

(72) Inventors: Ryuta Ishii, Musashino (JP); Takuya Kamisho, Musashino (JP); Yosuke Takeuchi, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 9 days.

(21) Appl. No.: 17/637,730

(22) PCT Filed: Aug. 27, 2019

(86) PCT No.: PCT/JP2019/033460
§ 371 (c)(1),
(2) Date: Feb. 23, 2022

(87) PCT Pub. No.: WO2021/038711
PCT Pub. Date: Mar. 4, 2021

(65) Prior Publication Data
US 2022/0283052 A1    Sep. 8, 2022

(51) Int. Cl.
*G01M 5/00* (2006.01)
(52) U.S. Cl.
CPC .................. *G01M 5/0033* (2013.01)
(58) Field of Classification Search
CPC .............................. G01M 5/0033; G01N 17/00
See application file for complete search history.

(56) References Cited

FOREIGN PATENT DOCUMENTS

| | | | | |
|---|---|---|---|---|
| JP | H11316209 A | * | 11/1999 | |
| JP | 2001215187 A | * | 8/2001 | ............. G01N 17/00 |
| JP | 3205291 B2 | * | 9/2001 | |
| JP | 2001-349956 A | | 12/2001 | |

(Continued)

OTHER PUBLICATIONS

Machine translation of JPH11316209A (Year: 1999).*

(Continued)

*Primary Examiner* — Alesa Allgood
*Assistant Examiner* — Sangkyung Lee
(74) *Attorney, Agent, or Firm* — Workman Nydegger

(57) ABSTRACT

A composition ratio calculating unit configured to calculate a first composition ratio that is a ratio of substance quantities of rust collected from a broken surface of internal steel of an updated old concrete structure and a second composition ratio that is a ratio of substance quantities of rust collected from a surface different from the broken surface, a composition ratio calculating unit configured to calculate a first corrosion time corresponding to the first composition ratio and a second corrosion time corresponding to the second composition ratio from characteristics representing a relation between a first corrosion time and the first composition ratio and a relation between a second corrosion time and the second composition ratio, respectively, and a breaking time calculating unit configured to calculate a time for the internal steel to break by subtracting the first corrosion time from the second corrosion time are included.

3 Claims, 5 Drawing Sheets

(56) References Cited

FOREIGN PATENT DOCUMENTS

JP            5801520 B1 * 10/2015   ........... G01N 17/006
JP        201695146 A * 8/2016

OTHER PUBLICATIONS

Machine translation of JP2016095146A (Year: 2016).*
Machine translation of JP2001215187A (Year: 2001).*
Machine translation of JP5801520B1 (Year: 2015).*
Machine translation of JP 3205291B2 (Year: 2001).*

* cited by examiner

FRACTURE TIME ESTIMATION DEVICE FOR INTERNAL STEEL AND METHOD

TECHNICAL FIELD

The present disclosure relates to an internal steel breaking time estimation device that estimates a hydrogen embrittlement breaking time of internal steel in a concrete structure and a method thereof.

BACKGROUND ART

For example, prestressed concrete used for a utility pole or the like secures its strength using steel embedded inside (hereinafter referred to as internal steel). When a crack occurs in concrete due to a certain factor, a corrosion reaction of the internal steel advances through the neutralization of the concrete. Hydrogen is generated by the corrosion reaction, and a part thereof is included in the internal steel, whereby the internal steel causes breaking due to hydrogen embrittlement. As a result, the strength of the entire prestressed concrete structure is reduced.

The hydrogen embrittlement is a phenomenon in which brittle breaking is caused by metal storing hydrogen. Thus, breakage of the internal steel due to hydrogen embrittlement is not limited to the prestressed concrete. The hydrogen embrittlement can occur in typical concrete having internal steel.

The breakage of the internal steel due to hydrogen embrittlement occurs inside the concrete, and thus it is impossible to visually detect breakage from the outside. For this reason, in conventional structure inspection, a non-destructive inspection technology for scanning breakage and corrosion of internal steel of concrete has been used (for example, PTL 1).

CITATION LIST

Patent Literature

PTL 1: JP 2001-349956 A

SUMMARY OF THE INVENTION

Technical Problem

However, in the method disclosed in PTL 1, only the presence or absence of breakage in the internal steel at the time of inspection is acquired. A time it takes for internal steel of concrete to break varies greatly depending on the environment in which a structure is installed. In addition, rapid detection of breakage of the internal steel in each installation environment requires significant effort, and thus it is difficult to acquire a breaking time in each individual environment. There is a problem in that it is not possible to know when the internal steel is broken.

The present disclosure is in consideration of this problem, and an objective of the present disclosure is to provide an internal steel breaking time estimation device that estimates a breaking time of internal steel of a concrete structure in a specific environment, and a method thereof. If the breaking time of internal steel of a concrete structure in a specific environment can be known, preventive maintenance of the concrete structure can be appropriately performed.

Means for Solving the Problem

An internal steel breaking time estimation device according to one aspect of the present disclosure includes a composition ratio calculating unit configured to calculate a first composition ratio that is a ratio of substance quantities of rust collected from a broken surface of internal steel of an updated old concrete structure and a second composition ratio that is a ratio of substance quantities of rust collected from a surface different from the broken surface, a corrosion time calculating unit configured to calculate a first corrosion time corresponding to the first composition ratio and a second corrosion time corresponding to the second composition ratio from characteristics representing a relation between a first corrosion time and the first composition ratio and a relation between a second corrosion time and the second composition ratio, respectively, and a breaking time calculating unit configured to calculate an internal steel breaking time, which is a time acquired by subtracting the first corrosion time from the second corrosion time.

An internal steel breaking time estimation method according to one aspect of the present disclosure is an internal steel breaking time estimation method performed by an internal steel breaking time estimation device includes calculating a first composition ratio that is a ratio of substance quantities of rust collected from a broken surface of internal steel of an updated old concrete structure and a second composition ratio that is a ratio of substance quantities of rust collected from a surface different from the broken surface, calculating a first corrosion time corresponding to the first composition ratio and a second corrosion time corresponding to the second composition ratio from characteristics representing a relation between a first corrosion time and the first composition ratio and a relation between a second corrosion time and the second composition ratio, respectively, and calculating an internal steel breaking time, which is a time acquired by subtracting the first corrosion time from the second corrosion time.

Effects of the Invention

According to the present disclosure, the breaking time of internal steel of a concrete structure in a specific environment can be estimated.

DESCRIPTION OF EMBODIMENTS

Hereinafter, embodiments of the present disclosure will be described with reference to the accompanying drawings.

The same components in a plurality of the drawings are denoted using the same reference signs, and description thereof will not be repeated.

Figure 1:
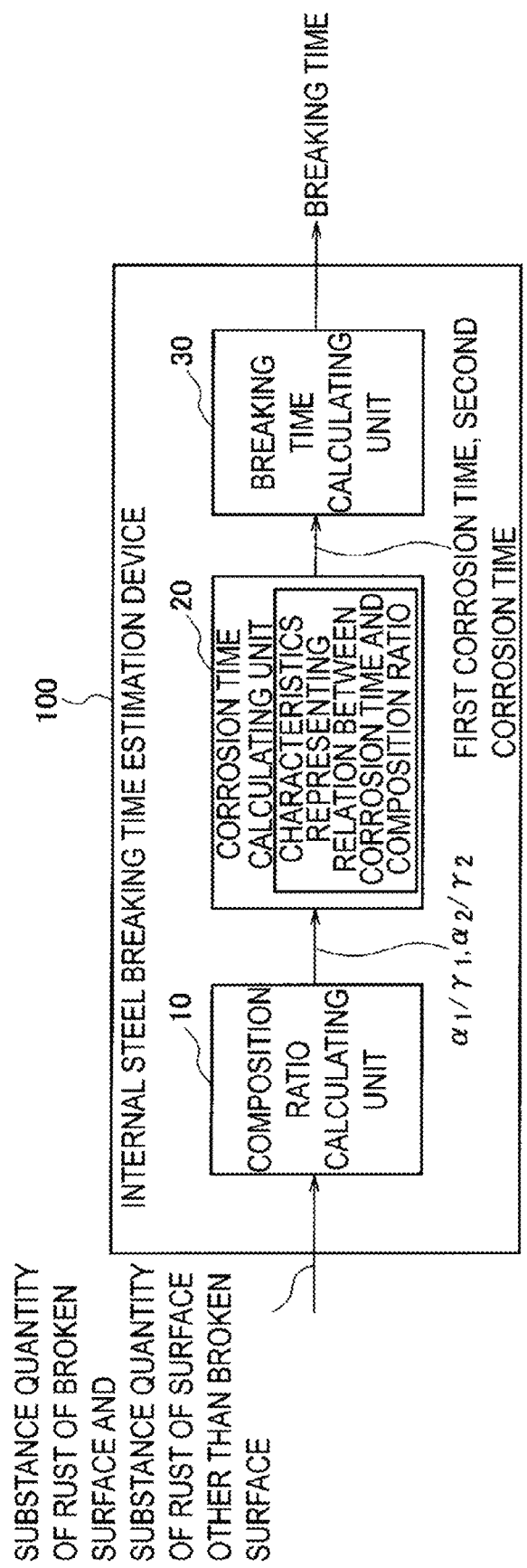
FIG. 1 is a block diagram illustrating an example of the functional configuration of an internal steel breaking time estimation device according to an embodiment of the present disclosure.

FIG. 1 is a block diagram illustrating an example of the functional configuration of an internal steel breaking time estimation device according to an embodiment of the present disclosure. The internal steel breaking time estimation device (hereinafter referred to as a breaking time estimation device) 100 illustrated in FIG. 1 is a device that estimates the breaking time of internal steel from an acquired component ratio of rust using a trend in which a composition ratio of iron oxyhydroxides in rust ($\alpha$-FeOOH/$\gamma$-FeOOH) increases in accordance with the passage of time.

The breaking time estimation device 100 includes a composition ratio calculating unit 10, a corrosion time calculating unit 20, and a breaking time calculating unit 30. For example, the breaking time estimation device 100 can be implemented by a computer that is composed of a read only memory (ROM), a random access memory (RAM), a central processing unit (CPU), and the like.

Figure 2:
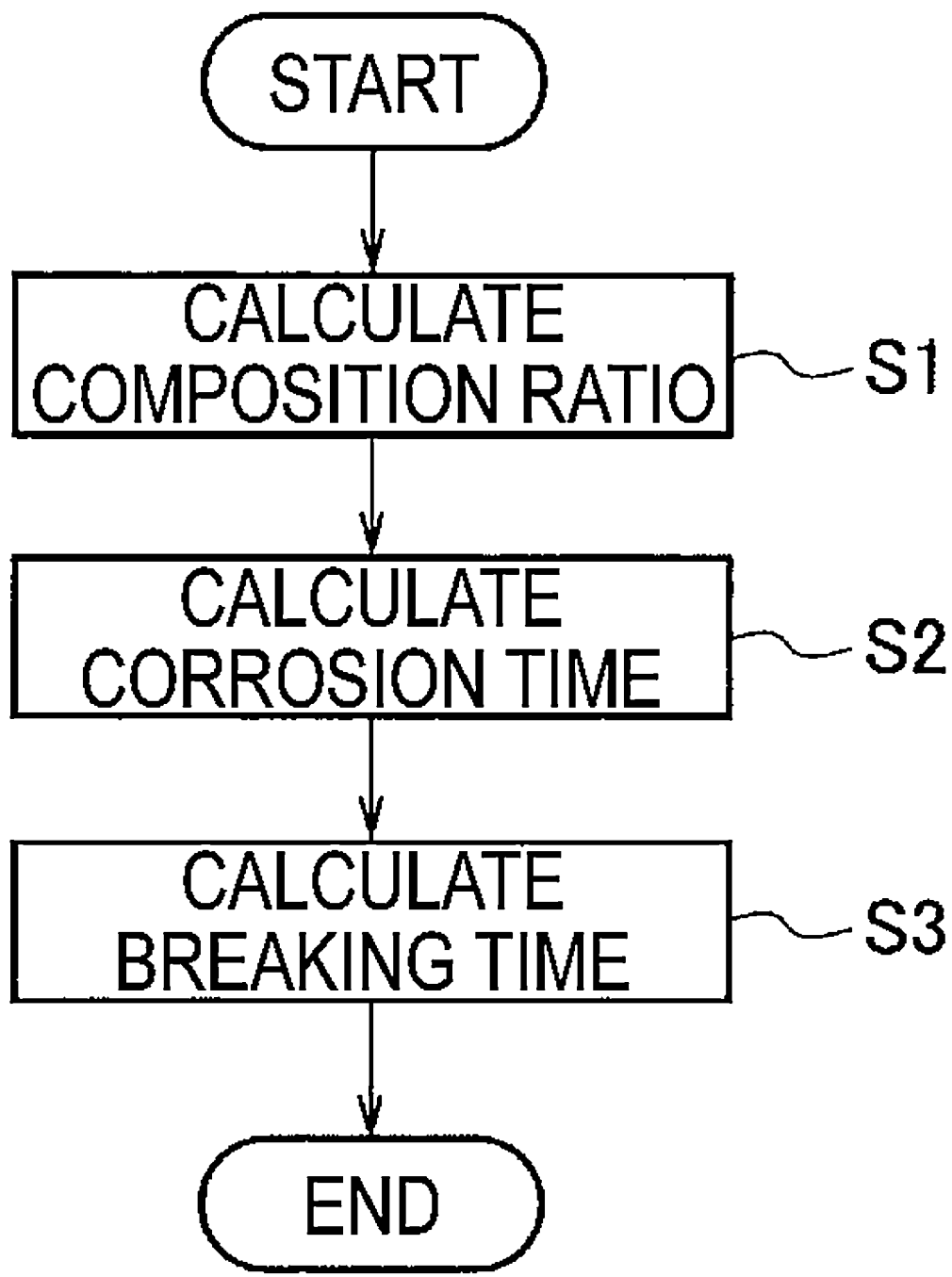
FIG. 2 is a flowchart illustrating a processing sequence of the internal steel breaking time estimation device illustrated in FIG. 1.

FIG. 2 is a flowchart illustrating a processing sequence of the breaking time estimation device 100. An operation of the breaking time estimation device 100 will be described with reference to FIGS. 1 and 2 and the other drawings.

The composition ratio calculating unit 10 calculates a first composition ratio that is a ratio of substance quantities of rust collected from a broken surface of internal steel of an updated concrete structure and a second composition ratio that is a ratio of substance quantities of rust collected from a surface different from the broken surface (step S1). Here, the updated concrete structure was installed in an environment close to an installation environment of a new concrete structure (in a specific environment) in which a breaking time of internal steel is desired to be estimated. Further, it is preferable that specifications of the old concrete structure are close to specifications of a new concrete structure.

Figure 3:
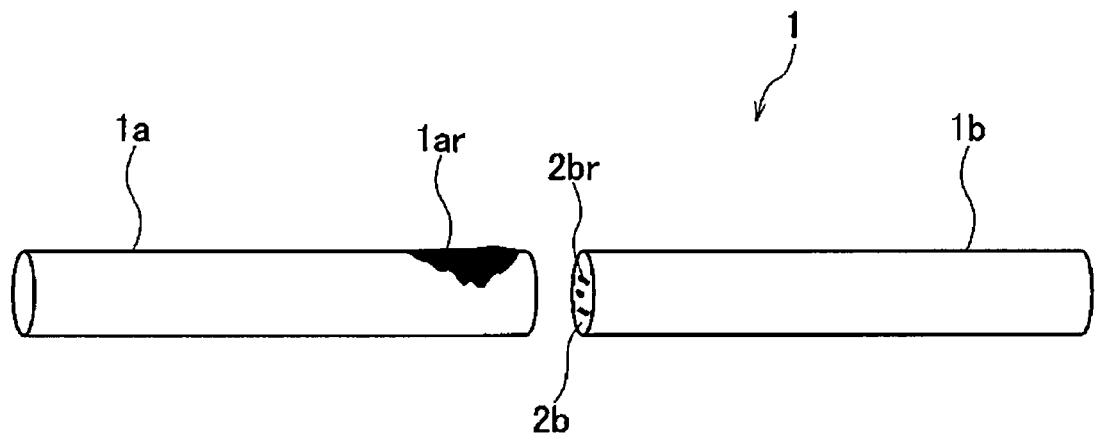
FIG. 3 is a diagram schematically illustrating broken internal steel.

FIG. 3 is a diagram schematically illustrating broken internal steel. The internal steel 1 illustrated in FIG. 3 is broken at a broken surface 2b through hydrogen embrittlement and is divided into pieces of steel 1a and 1b.

The substance quantities of rust are $\alpha$-iron oxyhydroxide and $\gamma_1$-iron oxyhydroxide of rust 2br of the broken surface 2b and $\alpha_2$-iron oxyhydroxide and $\gamma_2$-iron oxyhydroxide (hereinafter, a term "iron oxyhydroxide" will be omitted) of rust 1ar of a surface different from the broken surface 2b, for a total of four. For example, the four substance quantities $\alpha_1$, $\gamma_1$, $\alpha_2$, and $\gamma_2$ are measured using a powder X-ray diffractometer or the like and are input to the composition ratio calculating unit 10 from the outside.

The composition ratio calculating unit 10 calculates a first composition ratio $\alpha_1/\gamma_1$ of the rust 2br of the broken surface 2b and a second composition ratio $\alpha_2/\gamma_2$ of the rust 1ar of a surface different from the broken surface 2b (step S1).

The corrosion time calculating unit 20 calculates a first corrosion time corresponding to the first composition ratio $\alpha_1/\gamma_1$ of the rust 2br of the broken surface 2b and a second corrosion time corresponding to the second composition ratio $\alpha_2/\gamma_2$ of the rust 1ar of a surface different from the broken surface 2b from characteristics 21 that represent a relation between the corrosion time and the composition ratio ($\alpha/\gamma$) (step S2). As illustrated in FIG. 1, the characteristics 21 representing the relation between the corrosion time and the composition ratio are prepared in advance.

Figure 4:
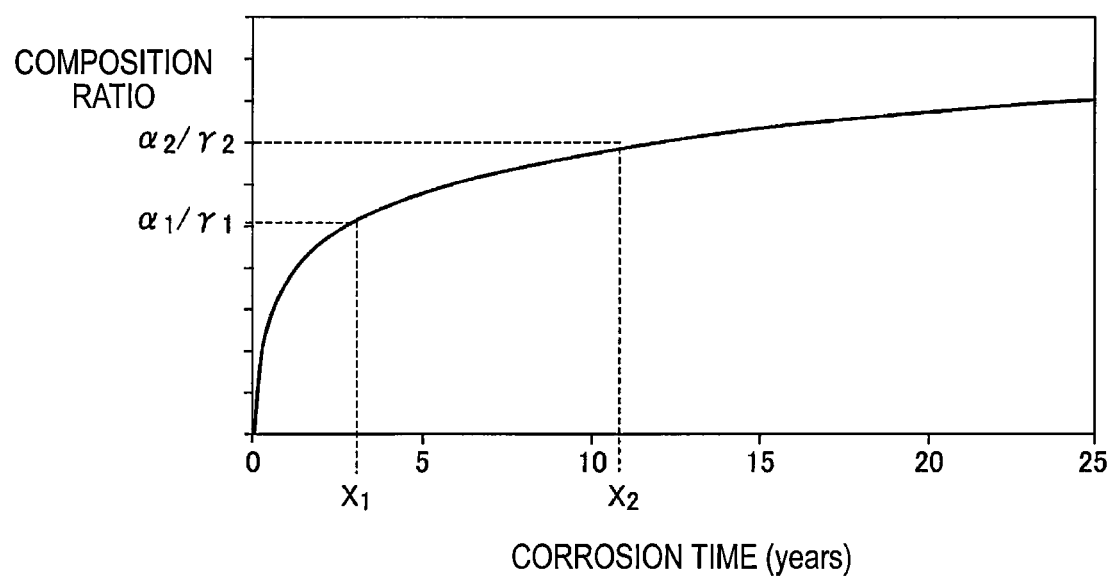
FIG. 4 is a diagram illustrating an example of characteristics of a relation between a corrosion time of internal steel and a composition ratio of rust.

FIG. 4 is a diagram schematically illustrating an example of the characteristics 21 representing a relation between the corrosion time and the composition ratio. In FIG. 4, the horizontal axis is corrosion time (years), and the vertical axis is a composition ratio $\alpha/\beta$. $X_1$ is a first corrosion time, and $X_2$ is a second corrosion time. The characteristics 21 may be determined by regressing a plurality of pieces of data representing the relation between the corrosion time and the composition ratio $\alpha/\beta$ acquired from an updated old concrete structure. In addition, known characteristics reported in reliable academic articles and the like may be used as they are.

As illustrated in FIG. 4, the relation between the corrosion time and the composition ratio $\alpha/\beta$ represents a characteristic in which the amount of change decreases over time. For example, this characteristic can be approximated by a logarithmic function (the following equation).

Math. 1

$$y = a \log_b X \tag{1}$$

Here, y is the composition ratio $\alpha/\gamma$ of rust. X is the elapsed time (corrosion time).

The corrosion time calculating unit 20 calculates a first corrosion time $X_1$ corresponding to the first composition ratio $\alpha_1/\gamma_1$ of the rust 2br of the broken surface 2b and a second corrosion time $X_2$ corresponding to the second composition ratio $\alpha_2/\gamma_2$ of the rust 1ar of a surface different from the broken surface 2b based on Equation (1).

The breaking time calculating unit 30 calculates an internal steel breaking time $(X_2 - X_1)$, which is a time in which the internal steel 1 is broken, by subtracting the first corrosion time $X_1$ from the second corrosion time $X_2$ (step S3).

Figure 5:
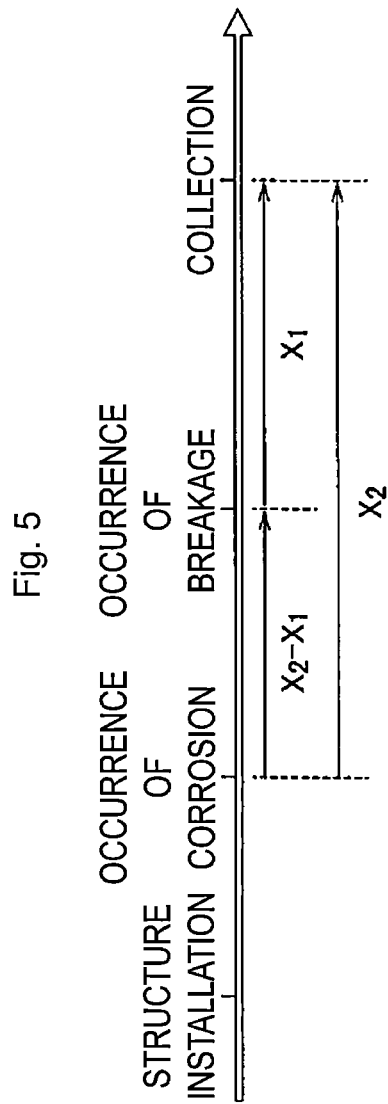
FIG. 5 is a diagram schematically illustrating relations between a first corrosion time, a second corrosion time, and an internal steel breaking time.

FIG. 5 is a diagram schematically illustrating the internal steel breaking time $(X_2 - X_1)$. In FIG. 5, the horizontal direction represents the elapse of time.

Installation of a structure illustrated in FIG. 5 represents installation of a concrete structure. Thereafter, a crack is generated in the concrete due to a certain factor, and a corrosion reaction of the internal steel proceeds through neutralization of the concrete (occurrence of corrosion).

Hydrogen is generated by the corrosion reaction, and a part thereof is included in the internal steel, whereby the internal steel is broken due to hydrogen embrittlement (occurrence of breakage). Thereafter, the corrosion of the broken surface 2b starts.

Thus, by subtracting the first corrosion time $X_1$, which is, for example, the corrosion time of the broken surface 2b, from the second corrosion time $X_2$, which is the corrosion time of the surface of the internal steel from the occurrence of corrosion until it is collected, the internal steel breaking time $(X_2 - X_1)$, which is a time in which the internal steel is broken, can be acquired.

When the internal steel breaking time $(X_2 - X_1)$ is acquired, preventive maintenance of the concrete structure can be appropriately performed. In other words, the concrete structure can be updated at an appropriate time, and reliable preventive maintenance can be performed.

Figure 6:
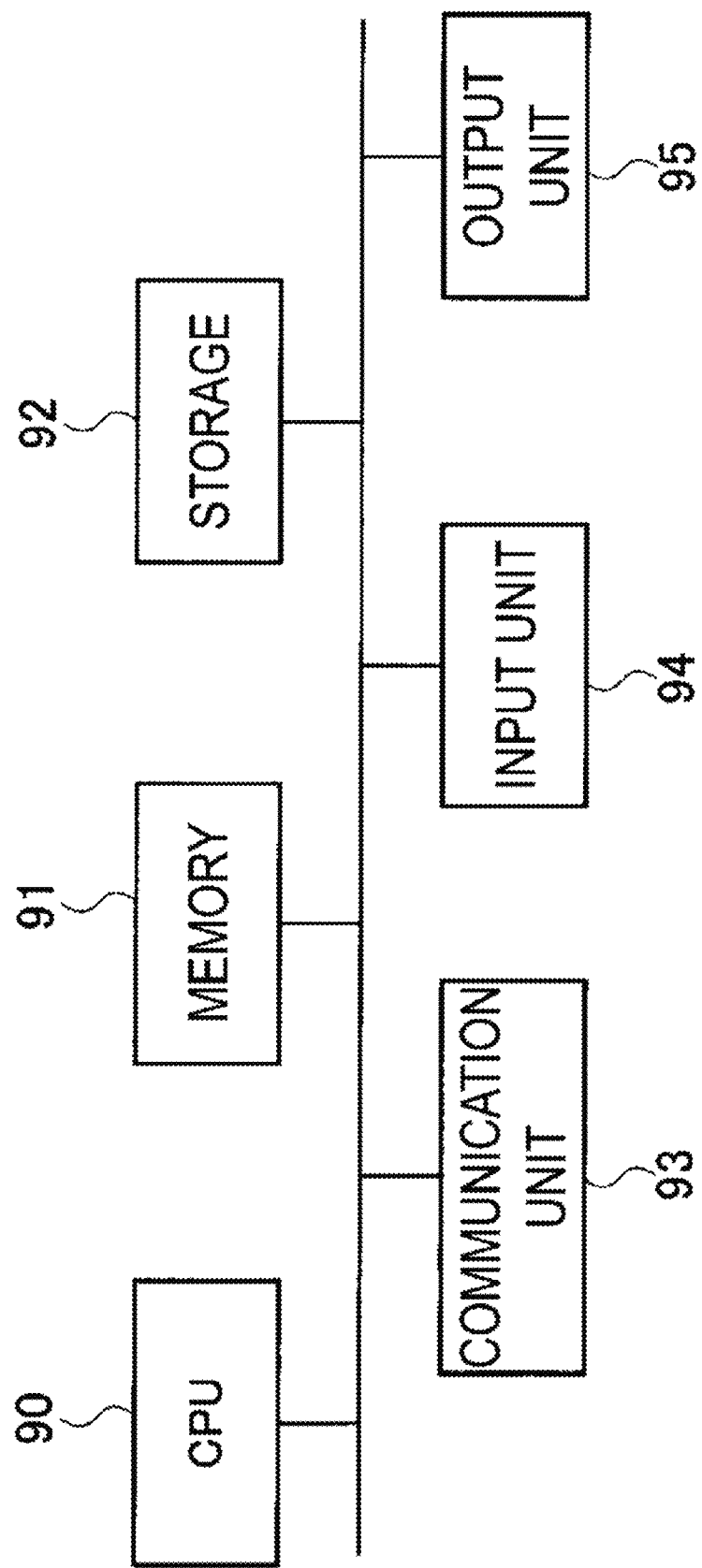
FIG. 6 is a block diagram illustrating an example of the configuration of a general-purpose computer system.

The breaking time estimation device 100 can be implemented by a general-purpose computer system illustrated in FIG. 6. For example, in a general-purpose computer system including a CPU 90, a memory 91, a storage 92, a communication unit 93, an input unit 94, and an output unit 95, by executing a predetermined program loaded into the memory 91 using the CPU 90, each function of the breaking time estimation device 100 can be achieved. The predetermined program may be recorded on a computer-readable recording medium such as a hard disk drive (HDD), a solid state drive (SSD), a universal serial bus (USB) memory, a compact disc read only memory (CD-ROM), a digital versatile disc read only memory (DVD-ROM), a magneto-optical disc (MO), or the like or may be distributed through a network.

The present disclosure is not limited to the embodiments described above, and modifications can be made within the scope thereof. For example, the breaking time estimation device 100 does not need to be configured using three functional components including the composition ratio calculating unit 10, the corrosion time calculating unit 20, and the breaking time calculating unit 30. The composition ratio calculating step S1, the corrosion time calculating step S2, and the breaking time calculating step S3 described in the embodiment described above, for example, may be executed by one functional component.

It is a matter of course that various embodiments and the like that are not described herein are also included in the present disclosure. Thus, the technical scope of the present disclosure is defined only by the matters specifying the disclosure relating to the aspects that are reasonable from the description above.

REFERENCE SIGNS LIST

1: Internal steel
1a, 1b: Steel
1ar: Rust of surface different from broken surface
2b: Broken surface
2br: Rust of broken surface
10: Composition ratio calculating unit
20: Corrosion time calculating unit
21: Characteristics representing relation between corrosion time and composition ratio
30: Breaking time calculating unit
100: Internal steel corrosion time estimation device
$X_1$: First corrosion time
$X_2$: Second corrosion time
$X_2-X_1$: Internal steel breaking time (time in which internal steel is broken)

The invention claimed is:

1. An internal steel breaking time estimation device comprising:
  a processor;
  one; or more non-transitory computer readable storage medium having stored thereon executable instructions that, when executed by the processor, cause the device to perform the following:
  measure a first substance quantity of rust from a broken surface of internal steel of an updated old concrete structure, and measure a second substance quantity from a surface different from the broken surface, wherein the broken surface is a surface along a break that has caused the concrete surface to break into two different pieces, the surface different from the broken surface being on a piece that is different from the piece that the piece that the broken is on;
  calculate a first composition ratio that is a ratio of the first substance quantities of rust measured from the broken surface of internal steel of the updated old concrete structure and a second composition ratio that is a ratio of the second substance quantities of rust measured from the surface different from the broken surface;
  calculate a first corrosion time corresponding to the first composition ratio and a second corrosion time corresponding to the second composition ratio from characteristics representing a relation between a first corrosion time and the first composition ratio and a relation between a second corrosion time and the second composition ratio, respectively;
  calculate a time for the internal steel to break by subtracting the first corrosion time from the second corrosion time; and
  determining, based on the calculated time for the internal steel to break, preventative maintenance steps to perform on the internal steel of the old concrete structure.

2. The internal steel breaking time estimation device according to claim 1, wherein the first composition ratio and the second composition ratio are ratios between a substance quantity of α-iron oxyhydroxide and a substance quantity of γ-iron oxyhydroxide.

3. An internal steel breaking time estimation method performed by an internal steel breaking time estimation device, the internal steel breaking time estimation method comprising:
  measure a first substance quantity of rust from a broken surface of internal steel of an updated old concrete structure, and measure a second substance quantity from a surface different from the broken surface, wherein the broken surface is a surface along a break that has caused the concrete surface to break into two different pieces, the surface different from the broken sir face being on a piece that is different from the piece that the piece that the broken is on;
  calculating a first composition ratio that is a ratio of the first substance quantities of rust measured from the broken surface of internal steel of the updated old concrete structure and a second composition ratio that is a ratio of the second substance quantities of rust measured from the surface different from the broken surface;
  calculating a first corrosion time corresponding to the first composition ratio and a second corrosion time corresponding to the second composition ratio from characteristics representing a relation between a first corrosion time and the first composition ratio and a relation between a second corrosion time and the second composition ratio, respectively;
  calculating a time for the internal steel to break by subtracting the first corrosion time from the second corrosion time; and
  determining, based on the calculated time for the internal steel to break, preventative maintenance steps to perform on the internal steel of the old concrete structure.

* * * * *